United States Patent [19]

Stevenson

[11] Patent Number: 4,458,712

[45] Date of Patent: Jul. 10, 1984

[54] VACUUM PRESSURE REGULATOR

[75] Inventor: David L. Stevenson, Corunna, Mich.

[73] Assignee: Schmelzer Corporation, Flint, Mich.

[21] Appl. No.: 428,348

[22] Filed: Sep. 29, 1982

[51] Int. Cl.³ ............................................. G05D 11/03
[52] U.S. Cl. .................................... 137/114; 123/409;
137/115; 137/DIG. 8
[58] Field of Search ................. 137/103, 114, DIG. 8,
137/115; 123/409

[56] References Cited

U.S. PATENT DOCUMENTS 2,650,581 9/1953 Short ..................................... 123/409
3,996,955 12/1976 Kawabata ...................... 123/409 X
4,198,937 4/1980 Suzuki ................................ 123/409

Primary Examiner—Robert G. Nilson
Attorney, Agent, or Firm—Fisher, Gerhardt, Crampton & Groh

[57] ABSTRACT

A vacuum pressure regulator responsive to the pressure established at a variable source of pressure such as the manifold of an engine to move a valve element in proportion to such pressure to admit air at atmospheric pressure to mix with air at vacuum pressure thereby momentarily reducing the level of vacuum pressure made available for the operation of various vacuum operated devices.

10 Claims, 3 Drawing Figures

VACUUM PRESSURE REGULATOR

This invention relates to vacuum operated valves and more particularly to a valve mechanism for momentarily reducing vacuum pressure.

Various mechanisms on automobiles are operated by vacuum actuated servo motors. Among such mechanisms are exhaust gas recirculating units and spark advance mechanisms. With such mechanisms at some times is desirable to momentarily reduce the rate at which vacuum pressure is established at the servo motor. For example, as an engine begins to accelerate it often is desirable to momentarily interrupt the full operation of the exhaust gas recirculating unit to permit the delivery of cleaner air to the carburetor until the engine reaches higher speeds at which time the exhaust gas recirculating unit can be allowed to function more fully.

It is an object of this invention to provide a vacuum reducing valve which will momentarily reduce the rate at which vacuum pressure is being established to modify the operation of vacuum operated devices.

It is another object of the invention to provide a valve of simple construction and which permits easy modification to change operating characteristics.

The objects of the invention are accomplished by a vacuum pressure regulator in which a housing forms a mixing chamber communicating with a variable source of vacuum pressure and with the vacuum operated device such as a vacuum motor. The mixing chamber also has an opening communicating with the atmosphere which is under the control of a valve moveable in response to the pressure at the variable vacuum source to admit air momentarily and at a controlled rate to mix with the fluid under vacuum pressure in the mixing chamber to thereby reduce the rate at which vacuum pressure is changing. The valve controlling the mixing of atmospheric air with the air under vacuum pressure is moved in a path through its full range in proportion to the vacuum level at the source of variable vacuum pressure.

A preferred embodiment of the invention is illustrated in the accompanying drawings in which.

Figure 1:
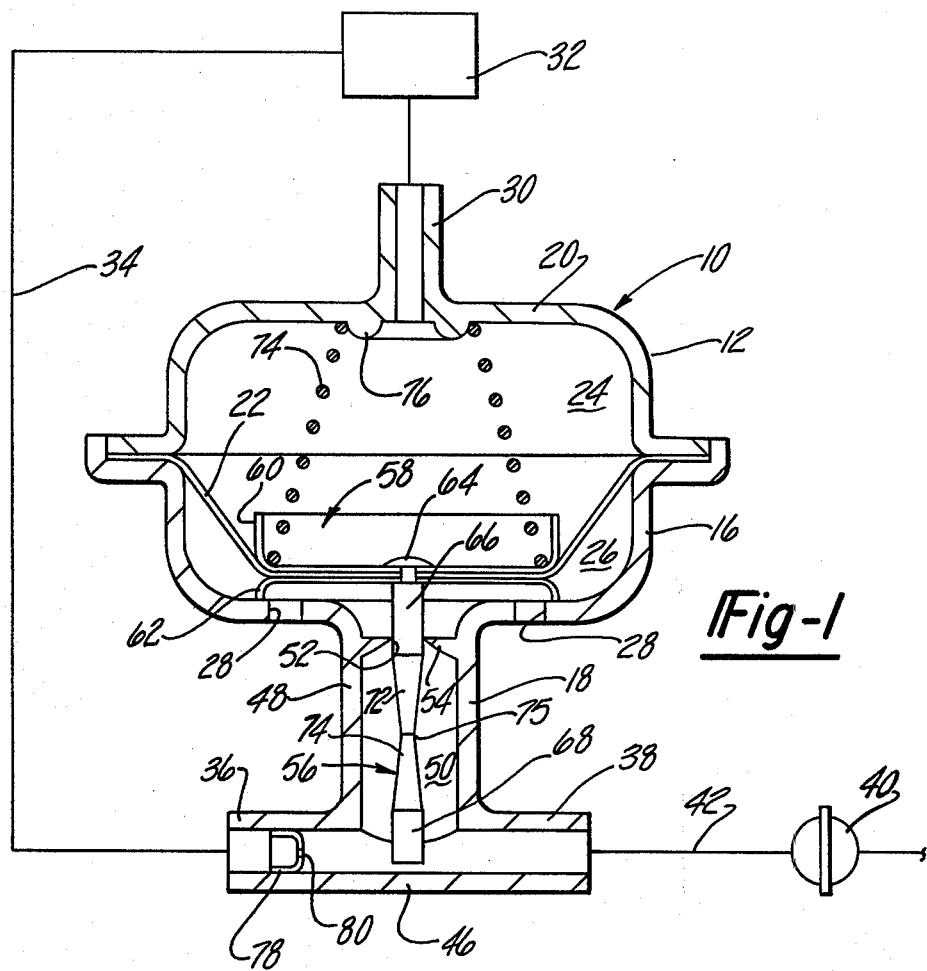
FIG. 1 is a cross-sectional view of a pressure regulator valve embodying the invention shown diagrammatically connected to a source of vacuum pressure and a device to be operated.

The pressure regulator valve embodying the invention is designated generally at 10 in FIG. 1 and includes a housing 12 which may be molded of plastic material. The housing 12 includes a housing member 14 having a generally pan-shaped portion 16 formed integrally with a tubular T-shaped portion 18. The pan-shaped portion 16 is closed by a similarly shaped pan-shaped cover member 20.

The pan-shaped portion 16 of the housing and the cover member 20 are clamped together in any conventional manner as by sonic welding or by fasteners. A flexible rubber diaphragm 22 is clamped between the pan-shaped portion 16 and the cover member 22 to divide the interior of the housing 12 formed by the portion 16 and cover 20 into a control chamber 24 and an air chamber 26 in constant communication with the atmosphere through openings 28. The control chamber 24 communicates through a tubular control port 30 formed in the cover member 20 with a source of variable vacuum pressure designated at 32. Such a source of vacuum 32 can be the intake manifold of an internal combustion engine.

The source of vacuum pressure 32 also is communicated through a line 34 with an inlet opening or port 36 formed by the T-portion 18 of the housing 12. The T-portion 18 also forms an outlet opening or port 38 which communicates with a device to be operated indicated at 40 through a line or conduit 42. The device to be operated 40 can be in the form of a vacuum operated servo motor operated to control an exhaust gas recirculating device or spark advance of other mechanisms.

The inlet end outlet ports 36 and 38 are at opposite ends of a tubular member 46 which is intersected by another tubular portion 48 which communicates with each other and form a mixing chamber 50. The mixing chamber 50 communicates with the air chamber 26 in the housing 12 through a valve port 52. The valve port 52 is formed by an annular internal flange 54 which tapers from the internal wall of the tubular portion 48 to the valve port 52.

The valve port 52 is under the control of an elongated valve element 56 one end of which is fastened to a diaphragm assembly 58 which includes the diaphragm 22. The diaphragm assembly 58 includes a backing plate 60 and backing plate 62 at opposite sides of the diaphragm 22. The backing plates 60 and 62 are held relative to each other and to the diaphragm 22 by means of a fastner 64 such as a screw or rivet passing through the backing plates 60 and 62 and connected to one end of the valve element 56.

The valve element 56 has barrel portions 66 and 68 at its opposite ends which are separated by converging or tappered portions 72 and 74. The barrel portions 66 and 68 form the major diametric dimension of the valve element 56 and the juncture 75 of the tappered portions 72 and 74 from the minimum diametric dimension of the valve element 56. As the valve element 56 is moved in the valve port 52, the opening between the relatively moveable parts varies between a minimum and maximum and back to a minimum as the valve element 56 is moved for its full length in the valve port 52.

The diaphragm assembly 58 is biased to the position seen in FIG. 1 by a conically coiled spring 74 one end of which is seated against the backing plate 60 and the other end about an annular spring seat 76 formed on a internal wall and around the control port 30 of the cover member 20.

The inlet port 36 is provided with a plug element 78 which has a restricted opening 80. The opening 80 is in series with the source of variable vacuum pressure and the device to be operated 40 so that the establishment of vacuum is delayed at a rate depending on the size of the opening 80. The plug element 78 is pressed into the tubular inlet port and is easily removable or replaceable with a plug element 78 having a different size opening 80.

Assuming that the source of vacuum pressure 32 is the manifold of an internal combustion engine, the various parts will occupy the position seen in FIG. 1 when the engine is not operating at which time the valve port 52 will be closed by the barrel portion 66 on the valve element 56. When the engine is started so that vacuum is established at the manifold and therefore at the source 32, such vacuum is conveyed simultaneously to the in control port 30 and through the line 34 to the inlet port 36. As a result, vacuum pressure is initiated in both the chamber 24 and the mixing chamber 50. Initially, the vacuum pressure is at a low level but as the engine increases in speed so too will the vacuum pressure at the source 32.

Establishing a vacuum pressure in the chamber 24 creates a differential pressure acting on the diaphragm assembly 58 because of the atmosphere pressure in the chamber 56 which causes the diaphragm assembly 58 to move upwardly. The diaphragm assembly 58 will move in proportion to the level of vacuum pressure established in the chamber 24 and in so doing, the valve element 56 is moved longitudinally in the valve port 52. As the valve element 56 moves from its initial position in which the port 52 is closed, the converging portion 72 will move into the valve port 52 and as the juncture 75 reaches the valve port 52 the opening between the valve element 56 and valve port 52 will be at its maximum thereby admitting and mixing atmospheric air from chamber 26 with air at vacuum pressure in mixing chamber 50. Continued movement will raise the valve element 56 until the barrel portion 68 ultimately closes the valve port 52. During such opening of the valve port 52, the mixing chamber 50 which is under vacuum pressure, will be subject to atmosphere pressure in the air chamber 26 such that the air will mix with the vacuum to reduce the vacuum level. This causes a reduction in the level of vacuum pressure made at the servo motor as the vacuum level increases from a minimum toward a maximum.

Figure 2:
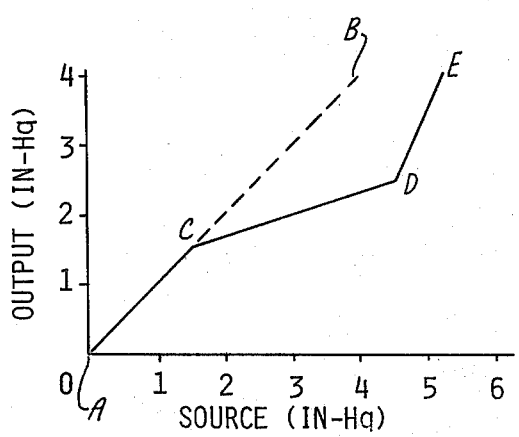
FIG. 2 is a curve showing one aspect of the operating characteristics of the pressure regulator valve of FIG. 1.

Operation of the pressure regulator 10 can be visualized by reference to FIG. 2 showing a characteristic curve in which the ordinate represents the pressure delivered to the device to be operated 40 and the abscissa represents the vacuum level at the vacuum source 32. In the absence of the pressure regulator valve 10 and with the source 32 connected directly to the device 40, the characteristic curve would be substantially a straight line A-B, in which the output and input would be in direct relationship to each other. With the pressure regulator valve 10 moving valve element 56 in proportion to the level of vacuum established in the chamber 24, the valve port 52 will begin opening as the tapered portion 52 moves upwardly until the juncture 75 is reached and the valve port 52 is at its maximum opening. This would be represented on the curve in FIG. 2 by the portion C-D. As the tapered portion 74 moves upwardly to begin closing of the valve port 52, the mixture of air reaching the mixing chamber 50 will be slightly reduced and the characteristic curve can be represented by that portion between the points D and E.

Figure 3:
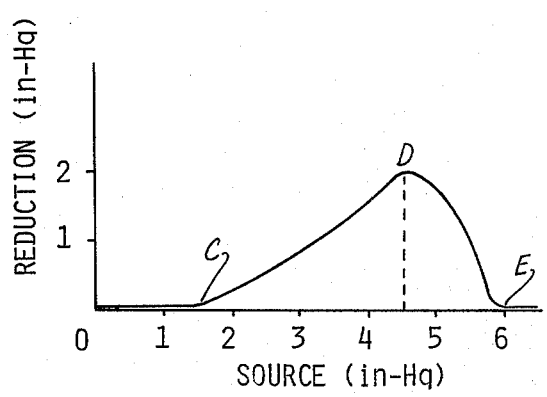
FIG. 3 is another curve showing other operating characteristics of the pressure regulator valve.

FIG. 3 is another form of characteristic or performance curve showing the reduction in vacuum pressure with the points C, D, and E corresponding to the points C, D, and E on the characteristic curve illustrated in FIG. 2. In the FIG. 3 curve, the ordinate represent a reduction in vacuum pressure over the amount that would normally be attained and the abscissa represents the pressure at the source 32.

The amount of reduction in vacuum pressure is a function of the strength of the spring 74 and the configuration of the valve element 56 and in particular the tapered portions 72 and 74. Delay in the reduction of vacuum pressure is determined by the size of restriction 80 which can be varied by replacement with plugs 78 having openings 80 of different sizes.

The embodiments of the invention in which an exclusive property or privilege is claimed are defined as follows:

1. A vacuum pressure regulator comprising: a housing member forming a mixing chamber, an inlet opening formed in said housing member to communicate said mixing chamber with a source of variable vacuum pressure, an outlet opening formed in said housing member to communicate said mixing chamber with a device to be operated by vacuum pressure, a valve port formed in said housing member and communicating said mixing chamber with the atmosphere, a valve element moveable relative to said valve port from a first position closing said valve port through a second position opening said valve port and to a third position reclosing said valve port, and control means responsive to pressure at said source of variable vacuum pressure for moving said valve element from said first toward said third position as vacuum pressure increases from a minimum to a maximum at said source.

2. The pressure regulator of claim 1 wherein said control means includes an auxiliary housing, a diaphragm dividing said auxiliary housing and forming a control chamber communicating with said source of variable vacuum pressure and an air chamber communicating with the atmosphere and said valve port.

3. The pressure regulator of claim 1 wherein said valve element is an elongated member tapering from a minimum dimension at an intermediate point to a maximum dimension substantially closing said port at each of its opposite ends.

4. The pressure regulator of claim 1 wherein a restricted opening is formed between said regulating chamber and said source of vacuum.

5. The pressure regulator of claim 1 wherein said valve port opens in proportion to the amount of movement of said valve element from said first position towards said second position and recloses in proportion to the amount of movement from said second position to said third position.

6. The pressure regulator of claim 1 wherein said control chamber and said regulating chamber are connected to the same source of vacuum pressure.

7. The pressure regulator of claim 1 wherein said air chamber is in continuous communication with the atmosphere.

8. The pressure regulator of claim 1 wherein said inlet opening has a restriction to delay fluid flow and the establishment of vacuum pressure in said mixing chamber.

9. A control valve comprising: a housing having first and second housing portions, said first housing portion supporting a diaphragm dividing the interior of said first housing portion into a control chamber at one side of said diaphragm and an air chamber at the other side of said diaphragm, said control chamber being adapted for connection to a source of variable vacuum pressure, said second housing portion forming a mixing chamber having inlet and outlet ports communicating with said source of vacuum and with a vacuum operated device, respectively, a valve passage formed between said first and second housing portions and between said air chamber and said mixing chamber, a valve element connected for movement with said diaphragm and being moveable in said passage in one direction from a first closed position preventing communication between said air and mixing chambers through an intermediate position opening said air and mixing chambers to each other and to a second closed position isolating said air and mixing chambers from each other as said diaphragm moves in proportion to the vacuum level in said control chamber, said valve element being moveable through its intermediate position at a vacuum level between a predetermined high and predetermined low to admit air from said air chamber to said mixing chamber to lower the level of vacuum pressure available at said outlet port.

10. The pressure regulator of claim 1 wherein said valve element is an elongated member having a minimum diameter at an intermediate point and tapers to a maximum diameter at its opposite ends in which it closes said valve port.

* * * * *

UNITED STATES PATENT AND TRADEMARK OFFICE
CERTIFICATE OF CORRECTION

PATENT NO. : 4,458,712
DATED : July 10, 1984
INVENTOR(S) : David Lee Stevenson

It is certified that error appears in the above-identified patent and that said Letters Patent is hereby corrected as shown below:

Column 1, line 10, "at" should be -- it --

Column 2, line 31-32, "fastner" should be -- fastener --

Column 2, line 37, "tappered" should be -- tapered --

*Signed and Sealed this*

*Second* Day of *April 1985*

[SEAL]

*Attest:*

DONALD J. QUIGG

*Attesting Officer*     *Acting Commissioner of Patents and Trademarks*